United States Patent
Chu et al.

(10) Patent No.: US 7,184,172 B2
(45) Date of Patent: Feb. 27, 2007

(54) METHOD AND SYSTEM FOR CONTROLLING PRINTER COLOR

(75) Inventors: Chia-Lin Chu, Tomball, TX (US); Gokalp Bayramoglu, Houston, TX (US); Henry M. D'Souza, Cypress, TX (US); Tam Q. Duong, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1085 days.

(21) Appl. No.: 10/184,468

(22) Filed: Jun. 27, 2002

(65) Prior Publication Data

US 2004/0001209 A1 Jan. 1, 2004

(51) Int. Cl.
*G06K 15/00* (2006.01)

(52) U.S. Cl. ............... 358/1.9; 358/2.1; 358/1.3

(58) Field of Classification Search ............ 358/1.9, 358/2.1, 1.3; 101/115; 400/120.1, 120.08, 400/124.11, 118.1, 118.2
See application file for complete search history.

(56) References Cited

U.S. PATENT DOCUMENTS

| | | | |
|---|---|---|---|
| 5,963,652 A | 10/1999 | Tran et al. .................. 381/109 |
| 6,039,430 A * | 3/2000 | Helterline et al. ............ 347/19 |
| 6,071,025 A * | 6/2000 | Shoki ......................... 400/191 |
| 6,125,449 A | 9/2000 | Taylor et al. ................ 713/310 |
| 6,268,845 B1 | 7/2001 | Pariza et al. ................ 345/112 |
| 6,289,466 B1 | 9/2001 | Bayramoglu et al. ....... 713/310 |
| 6,295,048 B1 | 9/2001 | Ward et al. ................. 345/121 |
| 6,460,103 B1 | 10/2002 | Powers et al. .............. 710/129 |
| 6,473,811 B1 * | 10/2002 | Onsen ......................... 710/15 |
| 6,897,988 B1 * | 5/2005 | Saito et al. ................. 358/515 |
| 2002/0154326 A1* | 10/2002 | Tsuchiya et al. ............ 358/1.9 |
| 2003/0048327 A1* | 3/2003 | Serra et al. ................... 347/43 |

FOREIGN PATENT DOCUMENTS

| | | | |
|---|---|---|---|
| EP | 0562979 A2 * | 3/1993 | |
| JP | 06008560 | * | 1/1994 |

* cited by examiner

*Primary Examiner*—Jerome Grant, II
(74) *Attorney, Agent, or Firm*—Fletcher Yoder

(57) ABSTRACT

A method for controlling printer color is provided. The method includes receiving cartridge color density data, such as from analysis of a test patch printed by the cartridge, and reference cartridge data, such as from analysis of a test patch printed and measured in accordance with a color standard. The color density data of the cartridge test patch is then mapped to the color density data of the reference cartridge test patch to generate mapped color density data, such as a look-up table that provides a dot activation for the cartridge that generates the same color density for a known dot activation for the reference cartridge. The mapped color density data is then used to control color density for printing a set of image data.

35 Claims, 8 Drawing Sheets

| | | | | | |
|---|---|---|---|---|---|
| 1002 | 1.0 | 0.0 | 0.05 | · · · 0.95 | 1.0 |
| 1004 | 0.7526 | 0.0 | 0.0437 | · · · 0.7309 | 0.7526 |
| 1006 | 0.9382 | 0.0 | 0.0484 | · · · 0.8952 | 0.9382 |
FIGURE 10    1000
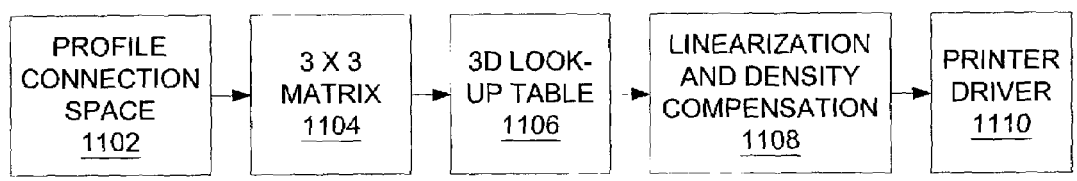
FIGURE 11    1100

DIAGRAM 1200

DIAGRAM 1300

DIAGRAM 1400

METHOD AND SYSTEM FOR CONTROLLING PRINTER COLOR

CROSS-REFERENCE TO RELATED APPLICATIONS

This application is related to co-pending and commonly owned application Ser. No. 09/822,094, filed Mar. 30, 2001, entitled "Automatic Printer Color Correction Based on Characterization Data of a Color Ink Cartridge," and to "Method and System for Characterizing Printer Color," which are both hereby incorporated by reference in their entirety.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to printer color control and more particularly to printer color control based on characterization data of an ink cartridge and a reference ink cartridge.

2. Description of the Related Art

To generate a printer profile, the printer manufacturer begins by printing a color test chart with the color ink jet printer model of interest. The color test chart, which carries the characteristics of the color ink jet printer on which it is printed, generally contains color patches for each shade of the colors of interest. A color measurement device such as a spectrophotometer or a calorimeter measures the spectral distribution or intensity of each color patch on the color test chart and the data is provided to a computer system of the printer manufacturer.

Color analysis software on the computer system analyzes the color data by comparing the color data for each patch of the color test chart to the corresponding standard color data such as defined by CIE (Commission International de l'Eclairage or International Commission on Illumination) color standards. A printer profile is then built based on this analysis to compensate or correct for the differences between the test color data and the standard color data. Based on the color analysis, a transformation matrix or a multidimensional look-up table of the printer profile can convert any standard color data to output color data for the color ink jet printer. The printer profile may further include a linearization table to linearize the standard color data before and after the matrix transformation.

A printer profile takes parameters into account such as printing process, ink types and rendering intention (e.g., perceptual, relative colorimetric, saturation or absolute calorimetric). The standard format for printer profiles as well as other types of device color profiles is described in the International Color Consortium (ICC) Specification ICC. 1:2001-12. In general, when a user selects to print an image, printer or imaging software on the computer system retrieves the printer profile from the color management system for the color ink jet printer and performs printer color correction for the image based on the profile.

The above approach to printer color correction does not take into account that an original color ink cartridge in a color ink jet printer will later be replaced by a new color ink cartridge, which itself can be replaced. Once a replacement color ink cartridge is used in the color ink jet printer, the printer profile generated with test color data when the color ink jet printer included the original color ink cartridge may not render consistent or perceptually uniform color for the color ink jet printer. A generic printer profile thus has been unreliable in rendering consistent color once the color ink jet printer includes a replacement color ink cartridge, with the result that images printed with replacement ink cartridges frequently do not appear the same as identical images that were previously printed using that printer.

SUMMARY OF THE INVENTION

In accordance with the present invention, a system and method for controlling printer color are provided that overcome known problems with controlling printer color.

In particular, a system and method for controlling printer color are disclosed that use reference ink cartridge data and specimen ink cartridge data to generate dot percent data that accurately reproduces color density levels in accordance with standards.

In accordance with an exemplary embodiment of the present invention, a method for controlling printer color is provided. The method includes receiving cartridge color density data, such as from analysis of a test patch printed by the cartridge, and reference ink cartridge data, such as from analysis of a test patch printed and measured in accordance with a color standard. The color density data of the cartridge test patch is then mapped to the color density data of the reference ink cartridge test patch to generate mapped color density data, such as a look-up table that provides a dot activation for the cartridge that generates the same color density for a known dot activation for the reference ink cartridge. The mapped color density data is then used to control color density for printing a set of image data.

The present invention provides many important technical advantages. One important technical advantage is a method for controlling color that maps specimen ink cartridge color density data for a given printer dot percentage activation to a reference ink cartridge color density, so as to allow accurate color densities to be generated.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIG. 10 is a diagram of an exemplary pixel color density variation correction process in accordance with an exemplary embodiment of the present invention;

FIG. 11 is a diagram of a system for generating printer data in accordance with an exemplary embodiment of the present invention;

DETAILED DESCRIPTION OF THE INVENTION

Figure 1:
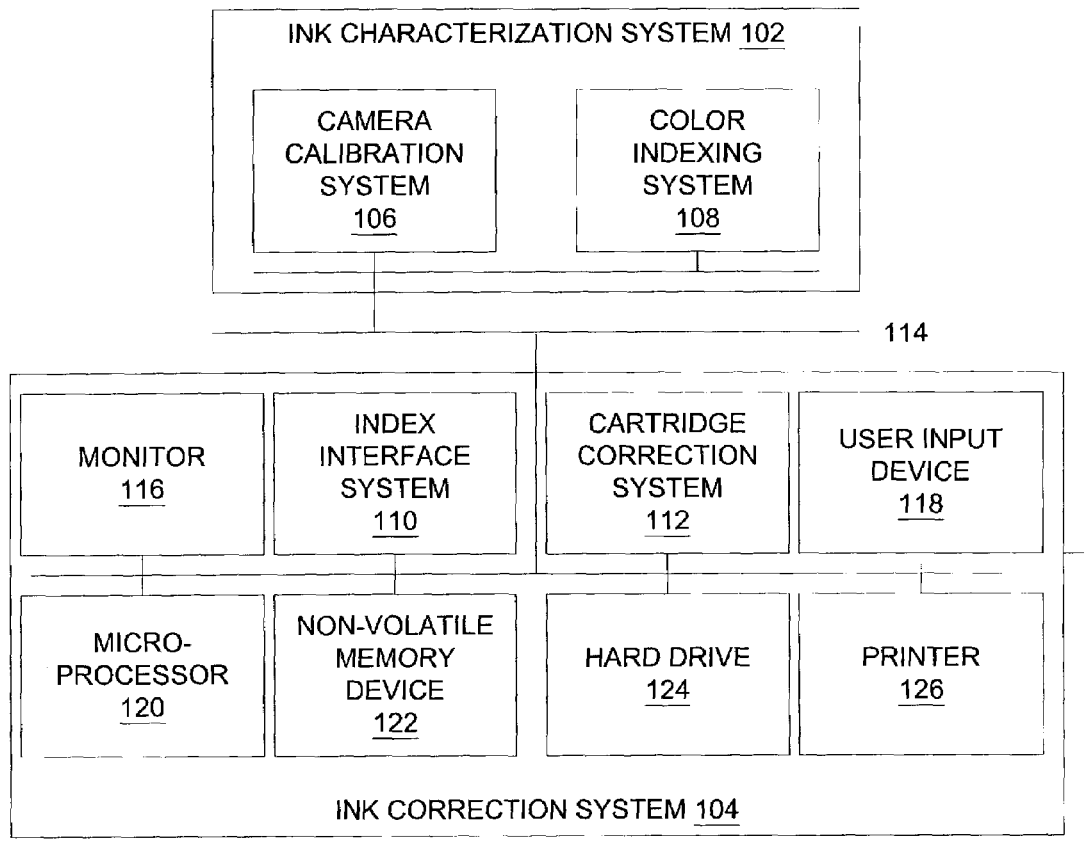
FIG. 1 is a diagram of a system for providing color characterization and color control in accordance with an exemplary embodiment of the present invention.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for providing color characterization and color control in accordance with an exemplary embodiment of the present invention. System 100 allows the color density generated for a corresponding dot activation for a specimen ink cartridge to be characterized as part of the manufacturing process, such that the color characterization data can be accessed when the cartridge is installed for use, and further maps the specimen ink cartridge data to reference ink cartridge data, so as to generate printer control data that activates the correct dot percentage to generate a desired color density. System 100 can also be used with other suitable methods and systems for generating color density, such as those that do not use dot activation.

System 100 includes ink characterization system 102 and ink correction system 104, each of which can be implemented in hardware, software, or a suitable combination of hardware and software, and which can be one or more hardware systems, or one or more software systems operating on a general purpose processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of software in a specific purpose software application. A software system can be stored on hard drive 124, and retrieved by microprocessor 120 for operation in conjunction with non-volatile memory device 122, user input device 118, printer 126, and monitor 116. In this exemplary embodiment, a software system can include a printer driver, a monitor driver, a camera driver, or other suitable software systems.

Ink characterization system 102 is coupled to ink correction system 104 by communications medium 114. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications medium 114 can be a local area network, a wide area network, a public network such as the Internet, the public switched telephone network, a wireless network, a fiber optic network, other suitable media, or a suitable combination of such media.

Ink characterization system 102 provides ink characterization data to ink correction system 104, such as when a user of ink correction system 104 installs a new cartridge, by storing the ink characterization data on the cartridge, or in other suitable manners. Ink characterization system 102 includes camera calibration system 106 and color indexing system 108, each of which can be implemented in hardware, software, or a suitable combination of hardware and software, and which can be one or more software systems operating on a general purpose processing platform.

Camera calibration system 106 is used to calibrate a video camera so that it can be used to provide color characterization data. In the past, colorimeters, spectrophotometers, or other specialized devices were required in order to obtain a precise estimate of the color of printed ink. Camera calibration system 106 performs calibration of video cameras having standard color pixel arrays with pixel filters so that high speed video cameras can be used to perform color characterization.

Color indexing system 108 receives the color characterization data for a specimen ink cartridge and stores it in a relational database so it can be retrieved at a later date. In addition, color indexing system 108 stores reference ink cartridge color characterization data and associated reference ink cartridge identification data with specimen ink cartridge data. In this manner, color indexing system 108 allows reference ink cartridge data and specimen ink cartridge data to be provided on demand, to be stored on a cartridge for transmission to the user, or in other suitable manners.

Ink correction system 104 includes index interface system 110 and cartridge correction system 112, each of which can be implemented in hardware, software, or a suitable combination of hardware and software, and which can be one or more software systems operating on a general purpose processing platform. Index interface system 110 retrieves the specimen ink cartridge color characterization data and the reference ink cartridge color characterization data, such as by contacting color indexing system 108 over communications medium 114, by retrieving the data from a data storage device of the ink cartridge, or in other suitable manners. Index interface system 110 then provides the data to cartridge correction system 112, which generates color correction factors from the specimen ink cartridge color characterization data and the reference ink cartridge color characterization data to be used for controlling printing. Cartridge correction system 112 can also receive other suitable data from ink characterization system 102 for controlling the quality of the color, such as empirical scale factors.

In operation, system 100 can be used as part of a manufacturing process to generate and distribute color characterization data for ink cartridges. Likewise, system 100 can be used to perform color characterization of replacement ink for such cartridges, to address nozzle failure, or in other suitable applications. Ink characterization system 102 is used to develop reference ink cartridge color characterization data and specimen ink cartridge color characterization data for specific cartridges.

Camera calibration system 106 is used to control the quality and repeatability of image data measurements made by different cameras, so as to perform high speed color density measurement and to avoid the need for expensive special-function devices, such as colorimeters and spectrophotometers.

Color indexing system 108 receives color characterization data for specimen ink cartridges and reference ink cartridges and provides the data on demand, with each cartridge, or in other suitable manners.

Index interface system 110 allows the user to obtain the cartridge correction data, either by querying color indexing system 108 over communications medium 114, by retrieving the reference ink cartridge data and specimen ink cartridge data from a data storage device of the cartridge, or in other suitable manners.

Cartridge correction system 112 uses the reference ink cartridge data and specimen ink cartridge data to determine correction factors for controlling printing. For example, the reference ink cartridge may be used to generate color density levels that are used to comply with standard organizations so as to insure consistent and uniform color of images on printed media, projectors, video screens, or in other suitable applications. Nevertheless, individual ink cartridges may produce non-standardized color density due to ink quality variations, nozzle parameter or functionality variations, or other factors.

System 100 allows ink cartridges to be characterized on a factory floor or in other suitable locations, such as a centralized testing facility, so that the characterization data can be provided to the users for correction of color, so as to ensure that the color of an original image is accurately reproduced. In this manner, the color characterization data for each cartridge can be used to determine whether a correction factor is required, and to generate the correction factor.

Figure 2:
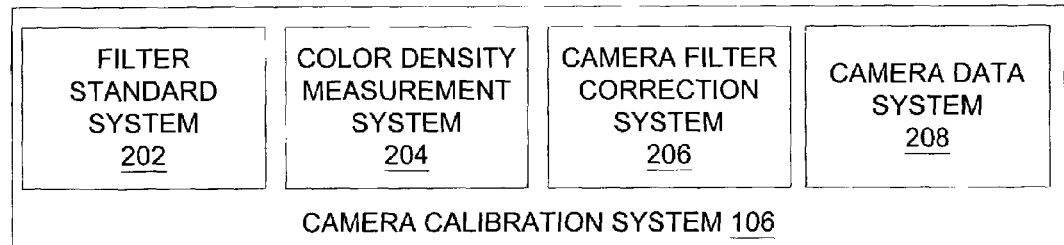
FIG. 2 is a diagram of a system for providing camera calibration in accordance with an exemplary embodiment of the present invention.

FIG. 2 is a diagram of a system 200 for providing camera calibration in accordance with an exemplary embodiment of the present invention. System 200 includes camera calibration system 106 and filter standard system 202, color density measurement system 204, camera filter correction system 206, and camera data system 208, each of which can be implemented in hardware, software, or a suitable combination of hardware and software, and which can be one or more software systems operating on a general purpose processing platform.

Filter standard system 202 stores and provides standard density data in accordance with one or more standards. In one exemplary embodiment, filter standards for density measurement can be provided for red-green-blue filters in various bandwidth and shapes, such as Status T, Status E, DIN, etc. In one exemplary embodiment, if filter standard system 202 is being implemented in North America, the Status T filter standard would be used, as it has been adopted as the densitometry standard for graphics arts in North America. The Status T filter standard employs three wideband filters. The measurements are a triplet of red density, green density, and blue density. The red density is most sensitive to the cyan patches, green density for magenta patches, and blue density for yellow patches. As a result, only one reading needs to be stored for each of the color patches, since the characterization chart contains only cyan, magenta, and yellow patches in various dot activations. Filter standard system 202 thus provides standardized data for a sample, such as an expected density value for the sample.

Color density measurement system 204 performs color density measurements of samples. In one exemplary embodiment, color density measurement system 204 is used to provide a camera that is being calibrated with one or more sample colors for measurement, where each sample has a known color density measured in accordance with one or more color standards. Color density measurement system 204 then receives the data generated by the camera and generates a color density measurement. This color density measurement can then be compared with filter standard system 202 data or other suitable data.

Camera filter correction system 206 is used to generate correction factors for a camera so that it can perform repeatable measurements with other calibrated cameras. In one exemplary embodiment, camera filter correction system 206 receives filter standard data from filter standard system 202 and color density measurement data from color density measurement system 204 and determines whether there is a difference. For example, if a cyan sample is being measured and a filter standard system 202 provides the value of 255 for the pixel brightness, and a camera being calibrating provides 248, then the difference can be due to a difference in the spectral power distribution of the light illumination source or the spectral response of the camera filter elements. Camera filter correction system 206 generates a correction factor so that the colors measured by the camera as corrected by the correction factor matched the colors indicated by filter standard system 202.

Camera data system 208 stores camera correction data from camera filter correction system 206 or other suitable sources and provides the data as needed to allow the calibrated cameras to be used in suitable processes, such as manufacturing processes. In one exemplary embodiment, camera data system 208 can be accessed over a communications medium when a camera is being installed for use, such as by receiving the camera identification number and providing the camera calibration data. Likewise, camera data system 208 can be used to store the calibration data with the camera, on a suitable storage media or in other suitable manners. For example, camera data system 208 can prompt an operator to enter a camera identification number before allowing a manufacturing process to begin, and can then confirm whether the camera has been calibrated within a specified calibration period or after a predetermined event, such as on a daily basis, in response to a change in lighting, or at other suitable times. If so, then the calibration factors can be supplied, otherwise an error message can be generated requesting the user to perform camera calibration or other suitable processes.

In operation, system 200 is used to calibrate a digital video camera for use in color characterization. System 200 compensates for variations in the spectral power distribution of the illumination source, the spectral responsivity of the camera pixels and filters, or other variations that may create differences in colors measured with a camera as compared to the color as measured in accordance with standards and special-function equipment such as colorimeters or spectrophotometers. System 200 thus allows manufacturing processes such as calibration of test equipment, periodic replacement of test equipment, periodic checking of test equipment, or other suitable processes to be performed. Likewise, system 200 allows high speed digital imaging cameras to be used in place of colorimeters or other equipment that provides accurate measurement capabilities but which is more expensive or which takes longer to operate and thus would not be feasible in the manufacturing environment.

Figure 3:
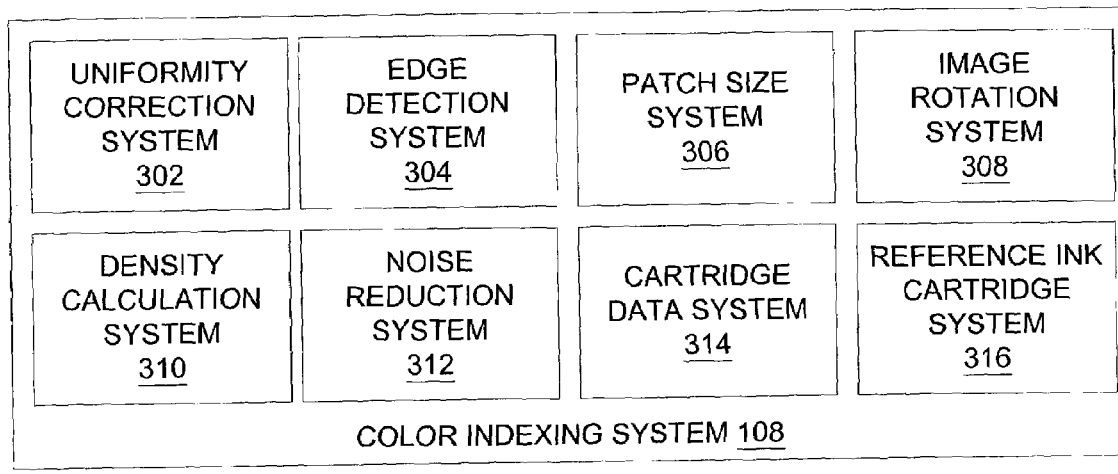
FIG. 3 is diagram of a system for performing color indexing in accordance with an exemplary embodiment of the present invention.

FIG. 3 is diagram of a system 300 for performing color indexing in accordance with an exemplary embodiment of the present invention. System 300 includes color indexing system 108 and uniformity correction system 302, edge detection system 304, patch size system 306, image rotation system 308, density calculation system 310, noise reduction system 312, cartridge data system 314, and reference ink cartridge system 316, each of which can be implemented in hardware, software, or a suitable combination of hardware and software, and which can be one or more software systems operating on a general purpose processing platform.

Uniformity correction system 302 can correct non-uniformity due to lighting of a color sample. In one exemplary embodiment, the following equations can be applied to perform this correction:

$G_d(x,y,)$=dark field with lens capped $G_w(x,y,)$=white field with the blank paper; and $P_p(x,y)=[P(x,y)-G_d(x,y,)]/[G_w(x,y,)-G_d(x,y,)]$ where $P_p(x,y)$ is the corrected image pixel for a given image pixel $P(x,y)$.

This correction factor thus compensates for changes in brightness so that consistent measurements can be taken regardless of the illumination of the sample.

Edge detection system 304 locates color calibration patches such that color values can be calculated for each patch. In one exemplary embodiment, edge detection system 304 locates the upper, lower, left, and right bounds and then the pixel locations of the four corners located in the upper bound and the lower bound. In this exemplary embodiment, the image is scanned from the top down on the center pixel column until a vertical grade is detected (i.e., a substantial difference between two adjacent vertical pixels). When the test color patch includes a row of red, then green, and then blue pixels, the upper bound can be located when there is a red vertical gradient is detected (red is the complimentary channel of cyan). Similarly, the lower bound can be found with the scan line from the bottom up when a blue vertical gradient is detected (blue is the complimentary channel of yellow). Several columns of pixels can be averaged so as to obtain a better signal/noise ratio.

Edge detection system 304 can also be used to locate the left and right bounds by scanning the image from left to right on the center row to detect a horizontal gradient (i.e., a substantial difference between two neighboring horizontal pixels). When the test color patch includes a first patch having 100% dot activation for indexing, and a last patch having 100% dot activation for color characterization, the left bound can be found when a green horizontal gradient is detected (green is the complimentary color channel of magenta). A similar process can be used scanning from right to left to detect the right bound. Several rows of pixels can also be averaged so as to obtain a better signal/noise ratio.

Edge detection system 304 can also be used to locate the corner pixels by testing the pixel values around the upper left corner in the neighborhood determined by the intersection of the upper bound and left bound to determine the coordinates of the exact upper left corner pixel, and by repeating this process to determine the coordinates of the pixels for the rest of the corners.

Patch size system 306 calculates the patch size based on predetermined patch characteristics, such as patch numbers, patch sizes, and other patch criteria. For example, if twenty-one patches are used ranging from zero to one hundred percent in five percent increments, then the patch size system 306 can generate patch coordinate data based on this predetermined patch criteria data. Likewise, patch size system 306 can prompt the user to enter the number of patches, can prompt the user to confirm the identify patches and data, or can perform other suitable processes.

Image rotation system 308 determines whether image data defining a color test patch needs to be rotated. For example, since the amount of angular correction is small in most cases, the amount of rotation can be approximated by the number of rows of pixels between the corner coordinates for the four patch corner coordinates. For example, if the top two corners have coordinates of (X1,0) and (X2,-3), an angle of rotation H) can be approximated as ΔY/ΔX, or -3/(X2-X1). Image rotation can then be performed by the following manner. For each row, detect the left bound as the origin, locate each pixel on the row to be rotated.

$X'=X \cos \Theta + Y \sin \Theta$ $Y'=-X \sin \Theta + Y \cos \Theta$

The second terms are zero if the first pixel of each row is the origin. Each rotated image point P(X', Y') can thus be determined.

Density calculation system 310 calculates the pixel image data density of each patch. In one exemplary embodiment, the following equation can be used:

$D=log10(P_{AVG}/255)$ where $P_{AVG}$ is the average color pixel value of a given patch. Likewise, other suitable statistical data can also or alternatively be calculated.

Noise reduction system 312 can be used to improve the signal to noise ratio, such as by averaging the pixels of each patch. Furthermore, as the image data values of the pixels along the border of each patch can be degraded due to various factors, such as the modular transfer function of the optical system of the camera, the resolution of the printer, and the number of the elements of the CCD imager, a number of bordering pixels can also be excluded in the calculation of the patch image data density values. Noise reduction system 312 can also check the linearity of the camera against Comission Internationale de l'Eclairage (International Commission on Illumination or CIE) XYZ tristimulus values with the twenty-four step gray wedge on the RI200008 Kodak Q60 Target (sRGB) target. The camera's RGB readings can be linearized with the following equation $$R'=R*Y/Y_n$$

where
R' is the linearized red value
R is the original red values
Y is the corresponding tristimulus Y value, and
$Y_n$ is the Y value of the blank media
Similar equations can be used to linearize green and blue values.

Cartridge data system 314 receives specimen ink cartridge color density characterization data, specimen ink cartridge identification data, specimen ink cartridge type data, and other suitable data and stores the data in a relational database. In addition, cartridge data system 314 provides the data upon demand, such as when specimen ink cartridge identification data is provided by a user when the specimen ink cartridge is being installed. Other suitable processes can also or alternatively be used, such as storing the specimen ink cartridge data in a data storage device of the specimen ink cartridge.

Reference ink cartridge system 316 receives reference ink cartridge color density characterization data, reference ink cartridge type data, and other suitable data and stores the data in a relational database. In addition, reference ink cartridge system 316 provides the data upon demand, such as when specimen ink cartridge identification data is provided by a user when the specimen ink cartridge is being installed, and specimen ink cartridge type data is used to correlate the specimen ink cartridge to a reference ink cartridge. Other suitable processes can also or alternatively be used, such as storing the reference ink cartridge data in a data storage device of the specimen ink cartridge.

In operation, system 300 allows color density data to be generated for use with reference ink cartridge color characterization data, specimen ink cartridge color patch, or other suitable data, and allows the specimen ink cartridge data and the reference ink cartridge data to be provided for use in controlling the specimen ink cartridge color. System 300 thus facilitates the generation of reference ink cartridge color characterization data and specimen ink cartridge color characterization data for color characterization and control.

Figure 4:
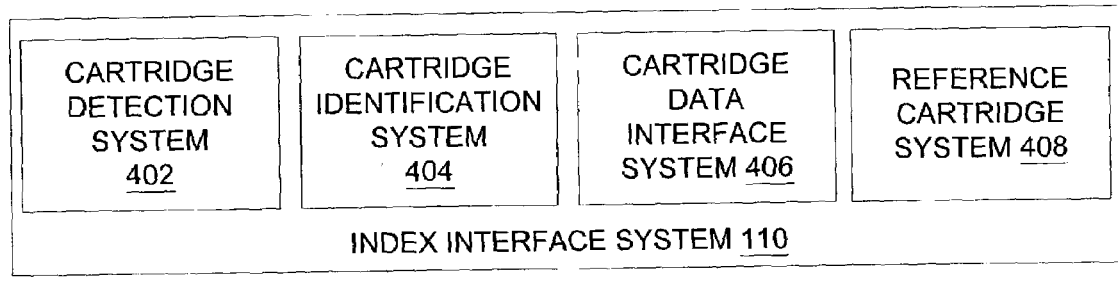
FIG. 4 is a diagram of a system for index interfacing in accordance with an exemplary embodiment of the present invention.

FIG. 4 is a diagram of a system 400 for index interfacing in accordance with an exemplary embodiment of the present invention. System 400 includes index interface system 110 and cartridge detection system 402, cartridge identification system 404, cartridge data interface system 406, and reference cartridge system 408, each of which can be implemented in hardware, software, or a suitable combination of hardware and software, and which can be one or more software systems operating on a general purpose processing platform.

Cartridge detection system 402 generates cartridge replacement data. In one exemplary embodiment, cartridge detection system 402 can detect whether an ink cartridge is present in a carriage, and can generate query data or other suitable data if it determines that the state of the carriage has gone from occupied to unoccupied or has otherwise changed in a manner that indicates that the cartridge is being replaced. In one exemplary embodiment, cartridge detection system 402 can generate a query asking the user to indicate whether a new cartridge has been provided. Likewise, cartridge detection system 402 can automatically detect the cartridge, such as by reading a cartridge identifier from a data memory device of the cartridge or other suitable devices.

Cartridge identification system 404 works in conjunction with cartridge detection system 402 to obtain cartridge identification data. For example, if cartridge detection system 402 requests the user to indicate whether or not the cartridge has been exchanged, then cartridge identification system 404 can subsequently prompt the user to provide the cartridge identifier if the user indicates that the cartridge has been changed. Likewise, cartridge identification system 404 can read cartridge data using optical imaging or by other suitable processes.

Cartridge data interface system 406 receives cartridge data for processing. In one exemplary embodiment, cartridge data interface system 406 can initiate an Internet connection, using existing Internet connection, initiate a telephone connection, or use other suitable processes to access a website, IRC site, or other suitable locations at which cartridge characterization data is stored for a cartridge.

Reference cartridge system 408 stores color characterization data for a reference ink cartridge. In one exemplary embodiment, reference cartridge system 408 can receive reference ink cartridge data from a manufacturer or other suitable sources, can allow a user to create a reference ink cartridge by using one or more calibrated cartridges, or can perform other suitable functions.

In operation, system 400 allows a remote processor to access specimen ink cartridge data, reference ink cartridge data, and other suitable data for use in generating color characterization and control data. System 400 allows such processes to be performed automatically, with user intervention, or in other suitable manners.

Figure 5:
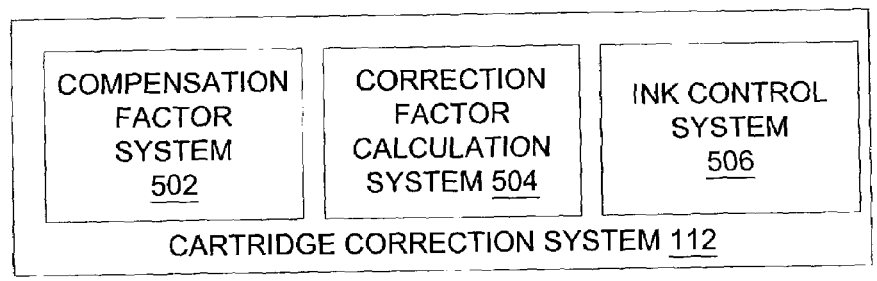
FIG. 5 is a diagram of a system for controlling a color cartridge in accordance with an exemplary embodiment of the present invention.

FIG. 5 is a diagram of a system 500 for controlling a color cartridge in accordance with an exemplary embodiment of the present invention. System 500 includes cartridge correction system 112 and compensation factor system 502, correction factor calculation system 504 and ink control system 506, each of which can be implemented in hardware, software, or a suitable combination of hardware and software, and which can be one or more software systems operating on a general purpose processing platform.

Compensation factor system 502 provides a compensation factor for use in determining a correction factor. In one exemplary embodiment, when a correction factor is calculated, an empirical compensation factor can also be applied where it has been determined that using the calculated compensation factor either over compensates or under compensates. For example, if a reference ink cartridge color density for a pre-determined dot activation is 100% and the specimen ink cartridge color density for that dot activation is 90%, then the specimen ink cartridge dot activation would need to be increased so as to provide more ink to generate the 1.0 color density. In this example, it might be determined that the specimen ink cartridge generates the 1.0 color density with a dot activation of 90. However, when 90 percent is used for the specimen ink cartridge, the color density realized in operation might be 0.9. Compensation factor system 502 can be used to adjust the dot activation from 90 percent to a value higher than 90 percent, such as one that is empirically determined.

Correction factor calculation system 504 generates a correction factor for use in correcting and controlling color. In one exemplary embodiment, correction factor calculation system 504 receives a specimen ink cartridge color density function and a reference ink cartridge color density function and maps the specimen ink cartridge to the reference ink cartridge. For example, if the reference ink cartridge color density for a dot activation is X and the specimen color density is Y, then a correction factor of X-Y is required. However, if the specimen ink cartridge dot activation is corrected to provide the full X-Y correction, then it may be determined that the correction overcompensates the amount of color, such that a correction factor of less than X-Y is desirable, as described above. Thus, correction factor calculation system 504 can calculate a theoretical correction factor, an actual correction factor using compensation factor system 502 or other suitable correction factors.

Ink control system 506 receives the correction factor generated by correction factor calculation system 504 and generates printing control data so as to generate accurate colors. In one exemplary embodiment, ink control system 506 can receive color density curve coefficients generated by curve fitting the specimen ink cartridge data on to the reference ink cartridge data, can generate a look-up table with 256 or 4096 data points, or can use other suitable processes to generate printing control data. For example, for a color density of D1, the reference ink cartridge data may indicate that a dot activation of N1 needs to be generated, but the mapped specimen ink cartridge data may indicate that a dot activation of N2 needs to be provided. Furthermore, after applying a correction factor, it may be determined that a dot activation of N3 is actually required. Ink control system 506 receives the values of N1 and maps them to values of N2 or N3, as appropriate.

In operation, system 500 performs color correction for specimen ink cartridges. System 500 receives specimen ink cartridge data, reference ink cartridge data, compensation factor data, or other suitable data, and determines the percentage of dots to fire for a desired color density. System 500 thus can be used to insure that the colors generated are representative of colors that would be generated by a standardized process.

Figure 6:
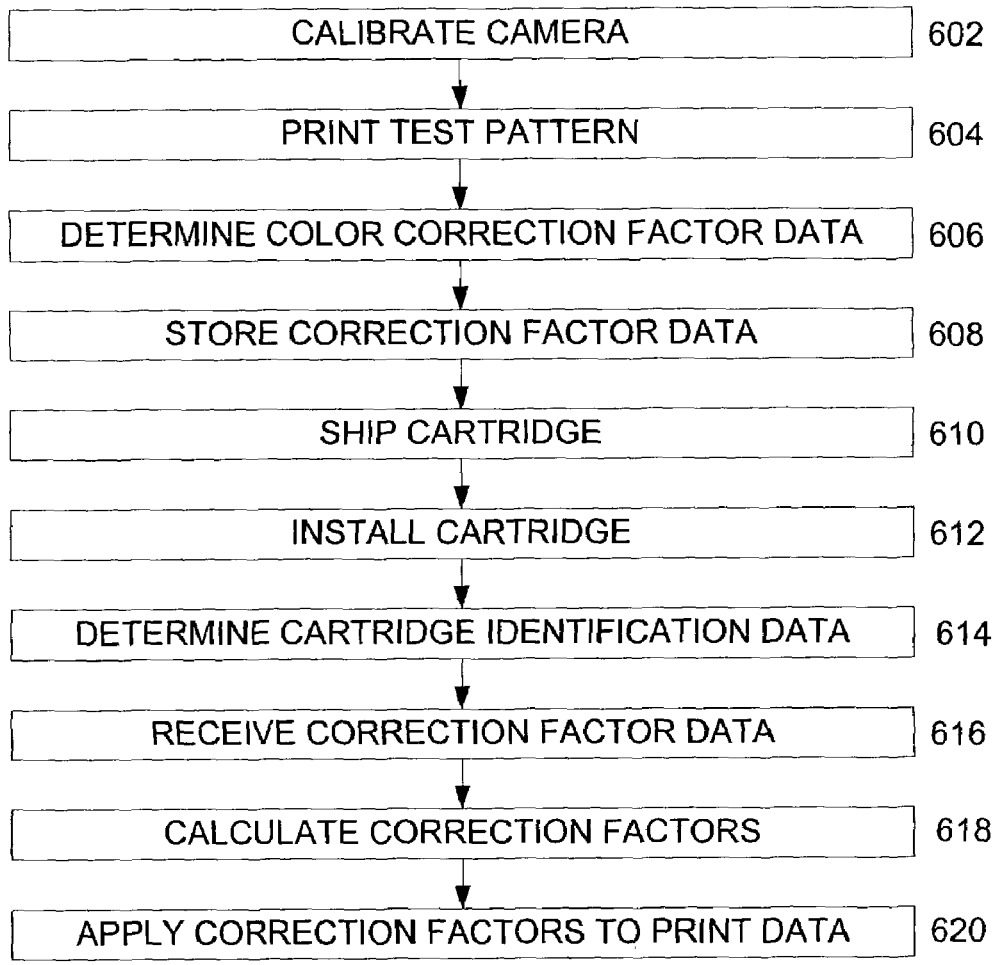
FIG. 6 is a flow chart of a method for performing color characterization and control in accordance with an exemplary embodiment of the present invention.

FIG. 6 is a flow chart of a method 600 for performing color characterization and control in accordance with an exemplary embodiment of the present invention. The method 600 begins at 602 where a camera is calibrated. In one exemplary embodiment, the camera can be calibrated by using standardized color patches and determining whether the color densities measured by the camera correspond to standardized color densities. Correction factors can then be generated and used to calibrate the camera. The method then proceeds to 604.

At 604 a test pattern is printed. In one exemplary embodiment, the test pattern can include a number patches ranging from a minimum dot activation to a maximum dot activation as printed by a specimen ink cartridge, a reference ink cartridge, or other suitable data. The test pattern can include a predetermined size and number of patches. The method then proceeds to 606.

At 606, color correction factor data is determined. In one exemplary embodiment, the color correction factor data can include density measurements for the test pattern, such as to generate specimen ink cartridge data, reference ink cartridge data, or other suitable data. Likewise, additional color correction factor data can be generated where suitable, such as polynomial coefficients for a polynomial curve generated after mapping the specimen ink cartridge data to the reference ink cartridge data, or other suitable color correction factor data. The method then proceeds to 608.

At 608, the color correction factor data is stored, such as for subsequent retrieval over the Internet or other suitable communications media, in a data storage device of a specimen ink cartridge, or other suitable manners. The method then proceeds to 610.

At 610, the cartridges are shipped. Each cartridge is typically shipped to a different location, and that location is not known until the cartridge is installed for use. At that time, it is possible for a user or the system to query a server or other data storage system automatically so as to obtain color characterization data.

At 612, the cartridge is installed at a location. For example, the user may remove an existing cartridge from a carriage, thus generating an indication that the cartridge has been removed, and can then replace that cartridge with the new cartridge, which allows the new cartridge to be detected. The method then proceeds to 614.

At 614, cartridge identification data is determined. The cartridge identification data is determined by querying a user, by reading data stored on data storage device, by optically scanning the data, or by other suitable methods. If the user is queried, the query can include a first query when the cartridge is removed to determine whether the user is replacing the cartridge or temporarily removing the existing cartridge. A second query can then be generated based on the location of the identifying data. For example, if cartridge identification data is on a surface that can be read after the cartridge is installed, on a box, or otherwise obtainable, then the query can be generated after the new cartridge is installed. Likewise, if the cartridge identification data is not accessible after installation, the cartridge identification query must be generated prior to installation of the cartridge. The cartridge identification data can also or alternatively be optically scanned, read from a data storage device, or obtained in other suitable manners. The method then proceeds to 616.

At 616, correction factor data is received. In one exemplary embodiment, correction factor data can be received from a centralized storage location, the factory, from a data storage device of the cartridge, or using other suitable processes. The method then proceeds to 618.

At 618, printer control factors are calculated. In one exemplary embodiment, the printer control factors can include one or more ink dot activation data relationships that are used to generate standardized color densities. For example, if it is determined that the ink dot activation settings have to be increased or decreased in order to generate a color density that would correspond to a standardized color density, the printer control data can include any correction factor. In this exemplary embodiment, one or more equation coefficients can be calculated that allow a standard printer dot activation value to be entered and that output a corrected printer dot activation for the ink cartridge, based on the color density data for that cartridge measured at 606. Also or alternatively, a set of look-up table values can be calculated and stored, or other suitable processes can be used. The method then proceeds to 620.

At 620, the correction factors are applied to print data. For example, print data can include an array of pixel values, where each value corresponds to a printer dot activation. The correction factors can then be applied such as by entering the printer dot activation data into an equation to generate a new printer dot activation setting, by looking up the corrected printer dot activation data using the input printer dot activation data in a look-up table, or by other suitable processes.

In this manner, the target color density can be replicated in a consistent manner without regard to printer cartridge, or other variables.

In operation, method 600 allows cartridge color to be characterized and controlled so as to provide for consistent color replication on different printers. Method 600 thus improves the quality of the color generated by a printer, so as to ensure that images generated by such printers will have desired aesthetic qualities.

Figure 7:
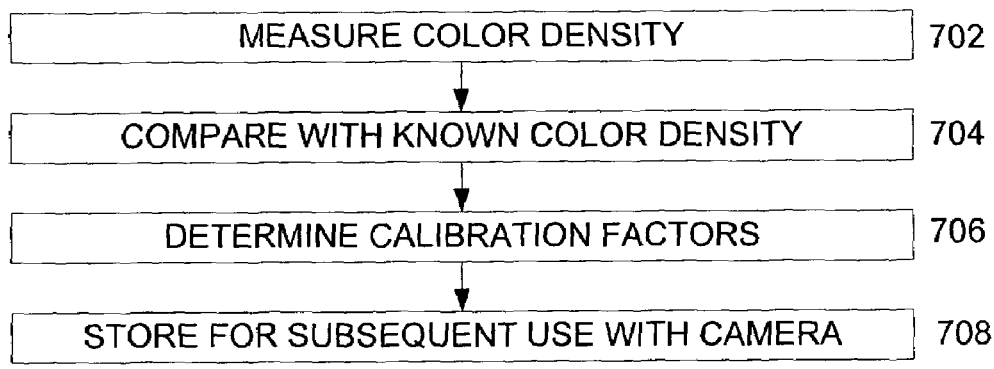
FIG. 7 is a flow chart of a method for calibrating a camera in accordance with an exemplary embodiment of the present invention.

FIG. 7 is a flow chart of a method 700 for calibrating a camera in accordance with an exemplary embodiment of the present invention. Method 700 allows a standard digital or analog camera to be used to measure color sample data for characterizing color for a specimen ink cartridge, a reference ink cartridge, replacement ink, or other suitable cartridges or ink.

Method 700 begins at 702 where color density is measured. In one exemplary embodiment, color density can be measured by generating a sample patch, and then measuring a pixel brightness for the illuminated sample patch. For example, functions such as uniformity correction or other processes can be performed so as to insure that actual pixel brightness is being measured and not apparent pixel brightness due to lighting variations. After the color density is measured at 702 the method proceeds to 704.

At 704, the measured color density is compared with a known color density. For example, each sample patch can include data that identifies the color density of the sample patch based on standardized measurement techniques. The measured color density is compared to the known color density to determine if there is a difference at 704 and the method proceeds to 706.

At 706, calibration coefficients are determined. For example, a polynomial curve fitting procedure, such as a second order polynomial, can be implemented between the color densities measured by the camera and the known values of the standardized color densities. The derived polynomial can be used to correct the color densities measured by the camera to the known standard color densities to specified accuracy. The method then proceeds to 708.

At 708, the calibration coefficients are stored for subsequent use with the calibrated camera. For example, the calibration coefficients can be used for all subsequent color density measurements, can be stored in a centralized location, can be stored with the camera, or can otherwise be provided for use with the calibrated camera when it is used in conjunction with the manufacturing process. Likewise, the date of calibration, location at which calibration was performed, the identity of the user that performed the calibration, or other suitable data can also be stored, such as to ensure that calibration is performed in accordance with standardized requirements.

In operation, method 700 allows a standard digital imaging device to be calibrated, so as to allow such a device to be used in manufacturing processes for characterizing ink cartridge color density. The calibration can be repeated in response to changes in environmental changes, such as changes in illumination due to new or aging light bulbs, camera changes such as camera drift or changes in camera settings, temperature changes, or other changes that can effect the measurement of color density. Method 700 thus allows such processes to be performed without the need for colorimeters, spectrophotometers, or other specialized equipment that is generally more expensive and slower than digital imaging devices.

Figure 8:
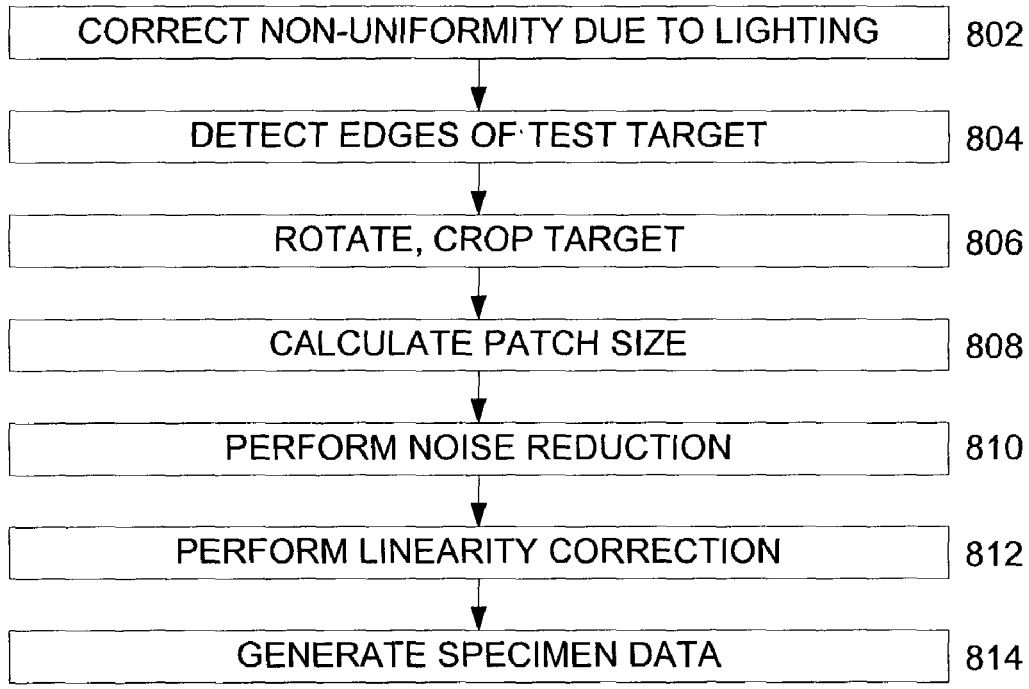
FIG. 8 is a flow chart of a method for processing test image data of a test target in accordance with an exemplary embodiment of the present invention.

FIG. 8 is a flow chart of a method 800 for processing test image data of a test target in accordance with an exemplary embodiment of the present invention. Method 800 begins at 802 where non-uniformity due to lighting is corrected. In one exemplary embodiment, a dark field reading and a light field reading can be taken and used to generate a correction factor to correct image data measurements, such as brightness measurements, so as to provide a consistent measurement of such image data regardless of lighting variations. Other suitable processes can likewise be used. The method then proceeds to 804.

At 804, the edges of the test target are detected. In one exemplary embodiment, the edges can be detected by reading a column of one or more pixels line by line from the top, bottom and sides until a color is detected, such as the edge color for the test specimen, a variation in brightness, or other suitable edge data. The method then proceeds to 806.

At 806, the test target is rotated if necessary. For example, the pixel data values of the test target might not correspond to the coordinate location of the target image data corners and edges, which can be determined from the edge data determined at 804. If the amount of test target rotation is determined to exceed allowable bounds for subsequent image data processing, the test target data can be rotated using a suitable process. The method then proceeds to 808 where patch coordinates are calculated. In one exemplary embodiment, the patch size can be based on the known edge and corner coordinate data and the number of patches in the X and Y dimensions of the test target. The method then proceeds to 812 where noise reduction is performed, such as by taking the average of all pixels in the patch excluding one or more edge rows or columns of pixels to prevent data degradation due to various factors, such as the modular transfer function of the optical system of the camera, the DPI of the printer, and the number of the elements of the CCD imager. The method then proceeds to 814.

At 814, linearity correction is performed, such as to check the linearity of the test target data against CIE XYZ tristimulus values with the twenty-four step gray wedge on the Q60 Target. The method then proceeds to 816, where specimen data is generated, such as by generating color density data based on the pixel brightness data.

In operation, method 800 allows image data to generated for characterizing color for a specimen ink cartridge, for generating reference ink cartridge data, or for other suitable purposes. The image data can include brightness data for a test patch, as measured by color pixels. Method 800 allows the test patch data to be processed so as to reduce noise, variations due to image rotation, or the effects of other factors. Method 800 also reduces the amount of operator input that is required to process test patch data, so as to allow the processing of test patch data to be automated.

Figure 9:
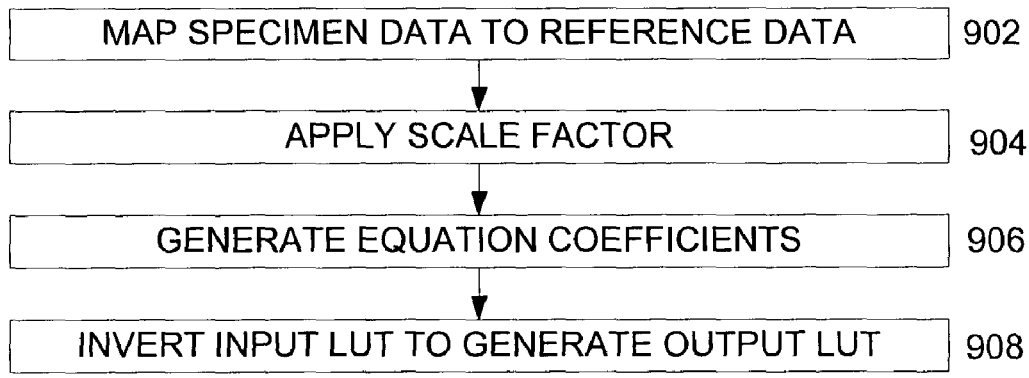
FIG. 9 is a flow chart of a method for generating printer control data in accordance with an exemplary embodiment of the present invention.

FIG. 9 is a flow chart of a method 900 for generating printer control data in accordance with an exemplary embodiment of the present invention. Method 900 begins at 902 where specimen data is matched to reference data. In one exemplary embodiment, the specimen data and the reference data can include a set of predetermined data points, such as color density measurements at dot percent activation. In this exemplary embodiment, the specimen data can include measurements at predetermined dot activations that produce a corresponding set of first color density data, and the reference data can include a second corresponding set of dot activations that produce a corresponding set of second color density data. If the first set of color density data is different from the second set of color density data, then the dot activation required by the specimen ink cartridge to generate the desired set of color density can be determined. For example, if the specimen ink cartridge generates less color density for a dot activation than the reference ink cartridge for the same dot activation, then the dot activation for the specimen ink cartridge can be increased to create the same density as the reference ink cartridge. Likewise, if the specimen ink cartridge generates more color density for a given dot activation than a reference ink cartridge, the dot activation can be decreased so as to allow the specimen ink cartridge to generate the same color density as the reference ink cartridge. The required dot activation for the specimen ink cartridge can thus be mapped to the reference ink cartridge so as to control the color density generated by the specimen ink cartridge. The method then proceeds to 904.

At 904, a scale factor is applied where suitable. In one exemplary embodiment, empirical measurements can be used to determine whether the calculated correction factor results in the correct color density. For example, due to printer control variations or other factors, it may be determined that using the calculated color density correction over compensates, under compensates, or otherwise provides incorrect color density results. If it is determined that a scale factor is required, the scale factor is applied at 904, such as to adjust the mapped dot activation to an empirically determined correct dot activation. The method then proceeds to 906.

At 906, equation coefficients are generated. In one exemplary embodiment, the data points can be curve fitted using fifth order polynomial curve fitting or other suitable processes to create an equation that identifies color density as a function of dot activation. The method then proceeds to 908 where this input look-up table equation is inverted to generate an output look-up table equation. For example, in the process described, an input look-up table is generated, whereas for a printer, an output look-up table is required for generation of specified densities, so as to determine the necessary dot activation for generation of a determined density. This inversion is performed at 908. Likewise, a table can be used or generated with 256 data points, 4096 data points, or other suitable numbers of data points, each printer data pixel data point can be generated as needed, or other suitable processes can be implemented.

FIG. 10 is a diagram 1000 of an exemplary pixel color density variation correction process in accordance with an exemplary embodiment of the present invention. Diagram 1000 includes dot activation data points 1002, specimen dot activation data points 1004, and compensated specimen dot activation data points 1006. In this exemplary embodiment, the color density is determined as a function of dot activation, such that in the first square, a first color density is generated for 100% dot activation, a zero density is generated for 0% dot activation, with different corresponding color densities being generated for dot activation increasing in 5% increments until the color density for 100% dot activation is again generated at the far right-hand side. This test patch structure can be used in one embodiment to improve test patch data processing, such as to allow edges to be readily located, noise reduction to be implemented, or other processes to be performed.

Specimen dot activation data points 1004 show the effective dot activation for a specimen ink cartridge printed with the same dot activation as the reference cartridge. Thus, the color density realized for 5% dot activation for the specimen cartridge only resulted in the color density for the reference cartridge that would be realized with 4.37% dot activation for the reference cartridge. A higher dot activation is therefore required in order to generate the color density that corresponds to that generated by the reference cartridge for 5% dot activation. The amount that is needed can be determined by interpolating using a mapping function between the data points of dot activation data points 1002 and specimen dot activation data points 1004.

Compensated specimen dot activation data points 1006 include a compensation factor of 25%, such that an equivalent dot activation of 4.84% instead of 4.37% is used, which is an adjustment to 25% of the difference of the dot activation between the reference dot activation of 5% and the measured specimen ink cartridge dot activation of 4.37%. Thus, in accordance with the exemplary embodiment shown in diagram 1000, using specimen dot activation data points 1004 results in color densities that are higher than required. The application of empirically-determined compensated specimen dot activation data points 1006 mapped to dot activation data points 1002 results in actual color densities that better approximate the color densities realized with the reference ink cartridge dot activation data points.

FIG. 11 is a diagram of a system 1100 for generating printer data in accordance with an exemplary embodiment of the present invention. System 1100 implements a standardized process, such as an international color consortium (ICC) process. System 1100 includes Profile Connection Space 1102 which can be based on an ICC model, and which can be used to feed 3×3 matrix 1104. A 3-D look-up table 1106 receives the data from 3×3 matrix 1104, and linearization and density compensation such as provided by system 100 is performed at 1108. The printer driver data is generated at 1110, such as where the red-green-blue data values are converted to cyan-magenta-yellow or other suitable color sets.

Figure 12:
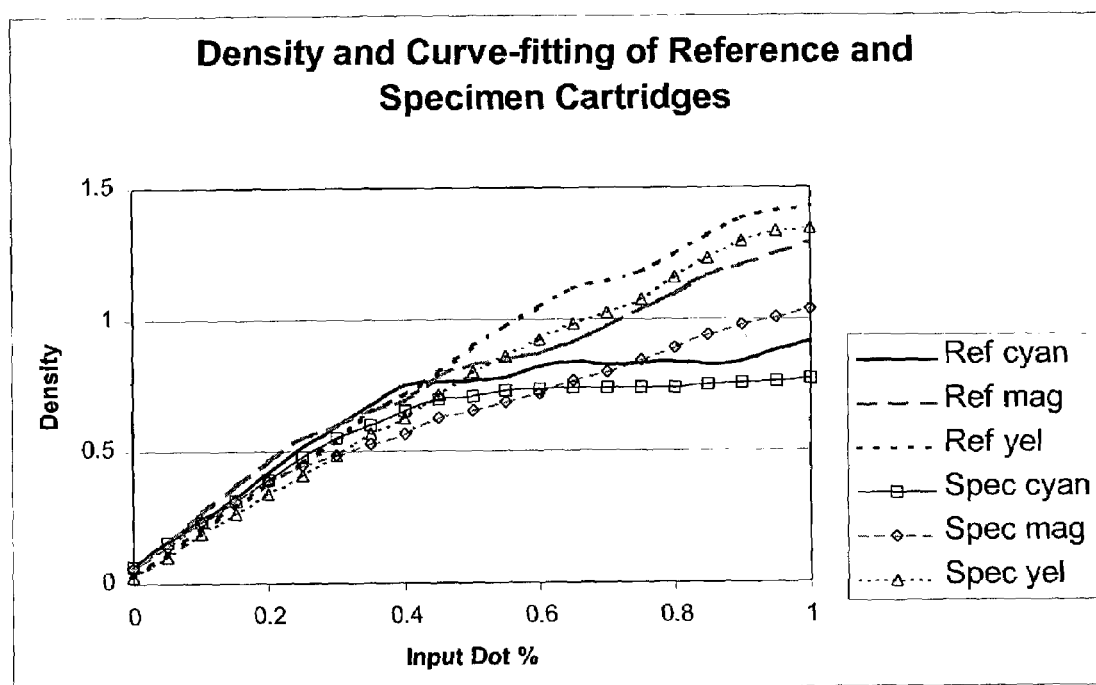
FIG. 12 is a diagram of specimen ink cartridge data and reference ink cartridge data in accordance with an exemplary embodiment of the present invention.

FIG. 12 is a diagram 1100 of specimen ink cartridge data and reference ink cartridge data in accordance with an exemplary embodiment of the present invention. As shown in FIG. 12, the curves generated for the specimen ink cartridges are for densities that are lower than the target density for the reference ink cartridge. In order to generate the reference densities, it is necessary to map the specimen ink cartridge curves onto the reference ink cartridge curves. For example, for the top-most two color curves, a color density for 100% input dots of approximately 1.3 is generated for the specimen ink cartridge, while the reference ink cartridge generates a color density of approximately 1.4. Thus, in order to generate a color density of 1.3 with the specimen ink cartridge, it is necessary for the specimen ink cartridge to be printing with 100% dot activation. Thus, a look-up table can be generated in which the specimen ink cartridge is driven at 100% of ink dot activation in order to generate a color density of 1.3, as opposed to driving the reference ink cartridge at approximately 90% dot activation to generate the same color density. Other suitable mapping processes can also or alternatively be performed.

Figure 13:
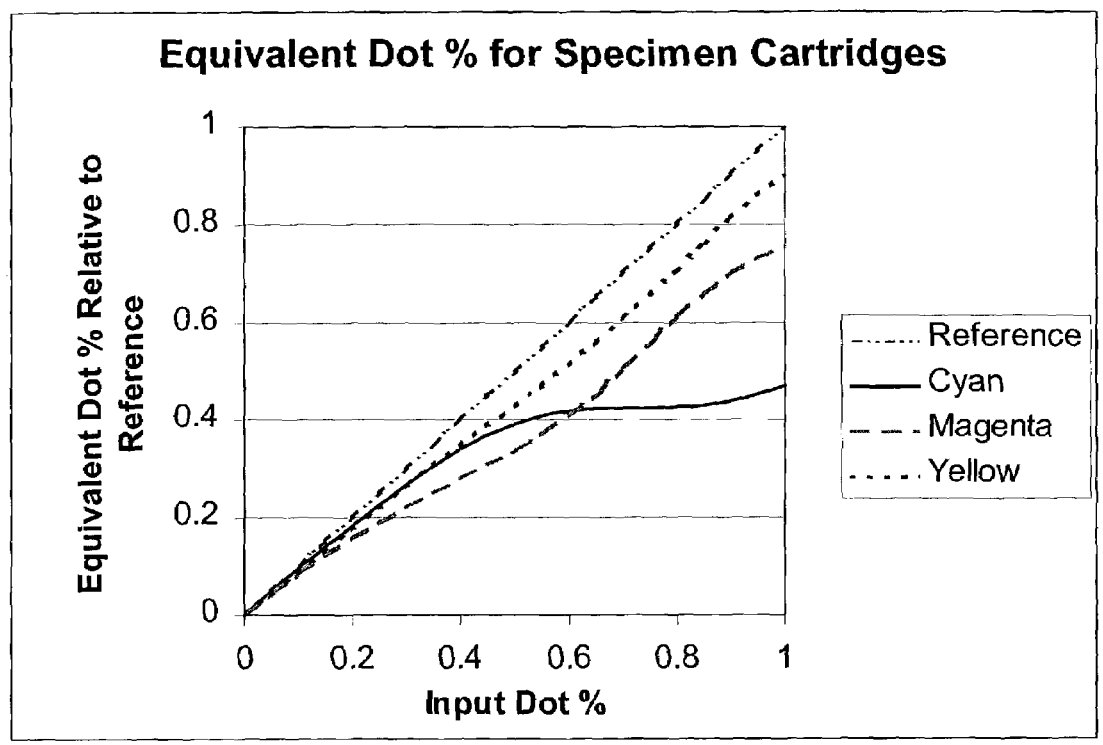
FIG. 13 is a diagram of mapped color data in accordance with an exemplary embodiment of the present invention.

FIG. 13 is a diagram 1300 of mapped color data in accordance with an exemplary embodiment of the present invention. As shown, the mapped data can be used for a specimen ink cartridge in order to determine the correct dot activations for generation of the color density levels of the referenced cartridge. As previously described though, a correction factor can also be used where suitable to provide the proper color density levels where it is empirically determined that the mapped values over- or under-compensate.

Figure 14:
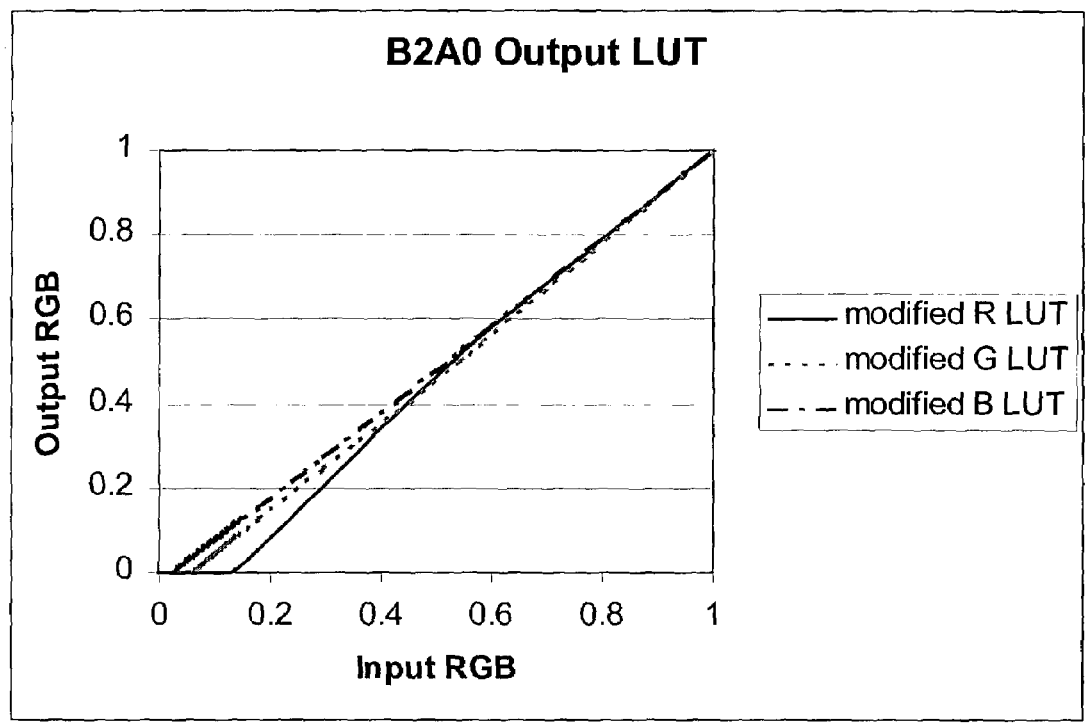
FIG. 14 is a diagram of an output look-up table for converting an input red, green, blue space to an output red, green, blue space in a binary to ASCII format.

FIG. 14 is a diagram 1400 of an output look-up table for converting an input red, green, blue space to an output red, green, blue space in a binary to ASCII format. The output look-up table includes a correction factor, and has further been inverted to convert the input data format shown in diagram 1300 into an output data format useful for generating printer nozzle control data for a specimen ink cartridge based on the printer nozzle control data for a reference ink cartridge.

In view of the above detailed description of the present invention and associated drawings, other modifications and variations will now become apparent to those skilled in the art. It should also be apparent that such other modifications and variations may be effected without departing from the spirit and scope of the present invention.

We claim:

1. A method for controlling printer color comprising: receiving cartridge color density data and reference cartridge data; mapping the cartridge color density data to the reference cartridge data to generate mapped color density data; and using the mapped color density data to control the printer color.

2. The method of claim 1 wherein using the mapped color density data to control the printer color comprises determining one or more color density equation coefficients.

3. The method of claim 1 wherein mapping the color density data to the reference cartridge data further comprises applying a correction factor.

4. The method of claim 1 wherein mapping the color density data to the reference cartridge data further comprises: determining a cartridge color density data point that corresponds to a cartridge dot activation data point; determining a reference color density data point that corresponds to the cartridge color density data point; determining a reference dot activation data point that corresponds to the reference color density data point; and using the cartridge dot activation data point when the reference dot activation data point is selected.

5. The method of claim 4 wherein a plurality of data points are used, and equation coefficients are determined from the cartridge dot activation data points.

6. The method of claim 1 wherein mapping the color density data to the reference cartridge data further comprises: determining a cartridge color density data point that corresponds to a cartridge dot activation data point; determining a reference color density data point that corresponds to the cartridge color density data point; determining a reference dot activation data point that corresponds to the reference color density data point; determining a difference between the cartridge dot activation data point and the reference dot activation data point; multiplying the difference by a scale factor to generate the correction factor; and using the reference dot activation data point adjusted by the correction factor when the reference dot activation data point is selected.

7. The method of claim 6 wherein a plurality of data points are used, and equation coefficients are determined from the adjusted reference dot activation data points.

8. The method of claim 1 further comprising using an International Color Consortium standardized process to generate printer driver data from the mapped color density data.

9. A system for controlling printer color comprising: an index interface system receiving cartridge color density data and reference color density data; and a cartridge correction system mapping the cartridge color density data to the reference color density data to generate color correction data.

10. The system of claim 9 wherein the index interface system further comprises a cartridge identification system receiving cartridge identification data and retrieving the cartridge color density data and the reference color density data in response to the cartridge identification data.

11. The system of claim 9 wherein the index interface system further comprises a reference cartridge system storing the cartridge color density data and the reference color density data.

12. The system of claim 9 wherein the cartridge correction system further comprises a correction factor calculation system determining a cartridge dot activation data point that generates a cartridge color density that directly corresponds to a reference color density generated in response to a reference dot activation data point.

13. The system of claim 9 wherein the cartridge correction system further comprises a compensation factor system determining a cartridge dot activation data point that generates a cartridge color density that corresponds by a scale factor to a reference color density generated in response to a reference dot activation data point.

14. The system of claim 9 wherein the cartridge correction system further comprises an ink control system that receives the color correction data and generates printer driver data using an International Color Consortium standardized process.

15. A system for controlling printer color comprising: an ink characterization system generating cartridge color density data and reference color density data; and an index interface system receiving the cartridge color density data and the reference color density data and generating printer control data.

16. The system of claim 15 further comprising a cartridge correction system mapping the cartridge color density data to the reference color density data to generate color correction data.

17. The system of claim 15 further comprising a compensation factor system receiving a compensation factor from the ink characterization system that is used to generate the printer control data.

18. The system of claim 15 further comprising a cartridge data system storing the cartridge color data and providing the cartridge color data to the index interface system upon demand.

19. The system of claim 15 further comprising a reference cartridge system storing the reference color density data and providing the reference color density data to the index interface system upon demand.

20. The system of claim 18 wherein the reference cartridge system is accessed by the index interface system over a communications link.

21. A printer driver that facilitates the providing of color-corrected images to a printer, the printer driver being adapted to: receive mapped color density data; and use the mapped color density data to control the printer.

22. The printer driver of claim 21 further comprising a hard drive storing the printer driver.

23. The printer driver of claim 21 wherein the mapped color density is received over the Internet.

24. The printer driver of claim 21 wherein the mapped color density is received from a printer cartridge.

25. A personal computer system that includes a microprocessor, a user input device, a non-volatile memory device, a hard drive, a monitor and a printer, the personal computer system comprising: a printer driver stored on the non-volatile memory device, the printer driver being adapted to retrieve color correction data.

26. The printer driver of claim 25 wherein the hard drive stores the printer driver.

27. The printer driver of claim 25 wherein the microprocessor operates the printer driver.

28. The printer driver of claim 25 wherein the color correction data is stored on a printer cartridge.

29. A printer cartridge comprising: a data storage device; wherein color correction data is stored on the data storage device and wherein the color correction data includes reference color density data and specimen color density data.

30. The printer cartridge of claim 29 wherein the color correction data is configured to be extracted from the data storage device and stored on a hard drive.

31. The printer cartridge of claim 29 wherein the color correction data includes mapped color correction data.

32. A printer comprising: a printer cartridge having a memory device; wherein the memory device stores color correction data and wherein the color correction data includes reference color density data and specimen color density data.

33. The printer of claim 32 wherein the color correction data is retrieved from the memory device and stored on a hard drive.

34. The printer of claim 32 wherein a microprocessor retrieves the color correction data.

35. The printer of claim 32 wherein the color correction data is stored on a nonvolatile memory device.

* * * * *

UNITED STATES PATENT AND TRADEMARK OFFICE
CERTIFICATE OF CORRECTION

PATENT NO. : 7,184,172 B2  Page 1 of 1
APPLICATION NO. : 10/184468
DATED : February 27, 2007
INVENTOR(S) : Chia-Lin Chu et al.

It is certified that error appears in the above-identified patent and that said Letters Patent is hereby corrected as shown below:

In column 1, line 39, delete "calorimeter" and insert -- colorimeter --, therefor.

In column 1, lines 59-60, delete "calorimetric)" and insert -- colorimetric) --, therefor.

In column 8, line 39, delete "H)" and insert -- Θ --, therefor.

In column 9, line 5, delete "RI200008" and insert -- R1200008 --, therefor.

Signed and Sealed this

Fourth Day of November, 2008

JON W. DUDAS
*Director of the United States Patent and Trademark Office*